Patented Jan. 20, 1948

2,434,649

UNITED STATES PATENT OFFICE 2,434,649

PURIFICATION OF CHLOROPHYLL BY FLOATING OFF IMPURITIES WITH THE AID OF A SALT SOLUTION

Benjamin Gruskin, New York, N. Y., assignor to Lakeland Foundation, Chicago, Ill., a corporation of Illinois No Drawing. Application February 14, 1942, Serial No. 430,971

11 Claims. (Cl. 209—173)

The present invention relates to a purification method and more particularly to the purification of the green chloroplast pigments.

The preparation of chloroplast pigments and particularly chlorophyll from plant material is normally attended by relatively complex extraction, fractionation and precipitation for the purpose of eliminating the plant and solvent impurities. Even under the best conditions, it is now appreciated that the resulting products are not of really high purity unless highly specialized methods are resorted to which tend to result in the impractically small yield. The commercial products in general, while suitable for coloring and other uses wherein high purity is not an important factor, are nevertheless so relatively impure for therapeutic and similar purposes as to prevent their general use. It is evident that since the full realization of the advantages of high purity chlorophylls depends in large measure upon their commercial availability at a moderate price, complex costly methods of purification are of scientific interest only. It has been observed that certain impurities which are present in products resulting from conventional methods of precipitation are particularly undesirable for therapeutic purposes.

It is therefore an important object of the present invention to provide not only a simple and inexpensive method for purifying chlorophyll but for separating and removing those impurities which tend to interfere with the therapeutic character thereof.

Another important object contemplates the provision of a method of purification as above which is particularly adapted to the improvement and purification of commercial chlorophyll preparations subsequent to their separation and purification from the plant material in accordance with conventional commercial practice. It is to be noted, however, that the present invention is not so limited but is similarly adaptable for use in conjunction with usual procedures of preparation.

Among other objects contemplated by the present invention are to provide a method as above which is particularly suitable in the case of so-called water soluble chlorophylls and particularly the chlorophyllins such as copper, iron and magnesium chlorophyllins and their salts and to provide a method such as the foregoing which is inexpensive and simple.

In accordance with the present invention, it has been discovered that salt solutions and particularly those of relatively high concentration tend not only to promote the separation and precipitation of plant impurities normally associated with the chlorophyll, but are without adverse or destructive effect upon the molecule of the pigment. In general, the salt may be utilized in conjunction with all aqueous preparations capable of effecting solution thereof and containing the desired chlorophyll pigment to be purified, either in the form of solution, as solid particles or crystals, or embodied as a colloid. In general, the presence of a substantial concentration of a solute, effects separation of undesired impurities having the appearance of fatty or waxy materials.

From the foregoing, it will be appreciated that the present method is particularly useful in the purification of the so-called water soluble forms of chlorophyll, such as the so-called chlorophyllins which are freely soluble in water, to form deep green colored solutions. Among such substances may be illustrated magnesium chlorophyllin, as well as copper and iron chlorophyllins and their salts. On the other hand, the present method, while substantially less effective, has some limited utility in the purification of the so-called fat and oil soluble chlorophylls which will hereinafter appear more in detail. In general, the starting materials may comprise any commercial chlorophylls of the foregoing class, even those hitherto considered as having relatively high purity. Many such latter products normally have at the best consisted of not more than 70% chlorophyll in addition to various unidentified impurities adapted to interfere with the therapeutic action thereof. On the other hand, relatively less pure preparations, for example, having an actual chlorophyll content of as low as 3% and lower and commercially termed chlorophyll are adapted to substantial improvement in purity and resultant therapeutic effect in accordance with the present method.

The salts used in the process may comprise any suitable freely water soluble salt, preferably neutral, non-reactive in character, and to which the chlorophyll is substantially inert. While all such salts as sodium chloride, potassium chloride, sodium nitrate and the like are suitable, it will be apparent that sodium chloride as probably the cheapest and most readily available of this group is to be preferred.

Particular attention is directed, moreover, to the fact that, since for therapeutic use, isotonicity is normally desirable and since further the conventional "physiological" solution contains sodium chloride, the instant salt though present as a residue of the process, is not objectionable.

In fact, a sufficient residue may be and preferably is provided for in order to assure proper isotonic adjustment of any resulting therapeutic preparations.

The following example more specifically illustrates the practice of the present invention. A sodium magnesium chlorophyllin salt produced by normal commercial practices and in the form of solid, dry particles or crystals is placed in a beaker or porcelain evaporating dish. The foregoing material in accordance with conventional standards, while considered of relatively high purity, normally contains only about 70% actual chlorophyllin. Over the mass of particles within the evaporating dish is poured a hyper-tonic salt solution, preferably containing at least 9.0 grams of sodium chloride per liter. More particularly, the salt solution desirably should possess a substantially increased concentration over the preferred minimum and may for most purposes possess a concentration at or about the saturation point. Attention is particularly directed to the fact that where the presence of a substantial amount of salt is undesired in the final product, the foregoing preferred addition should be modified somewhat depending upon the portion of salt retained in the final product as will hereinafter more fully appear.

Sufficient of the hyper-tonic salt solution is added to adequately cover the particles of chlorophyllin although any excess should be avoided in order to restrict the loss of chlorophyll through solution in the aqueous liquid. The contents of the dish are now mixed slightly, then permitted to rest quietly for twelve hours to forty-eight at room temperature. The preparation may be slightly agitated at periodic intervals but permitted to rest for at least the latter half of the period. At the end of the foregoing time, it will be seen that a scum of fatty or waxy material has risen to the top of the aqueous layer as the result of separation from the particles of the chlorophyllin. The scum of impurities can be readily removed mechanically from the surface or poured off as by decanting. This is followed by pouring off the entire remaining solution and drying the resulting solid particles remaining in the dish. The resulting product has a substantially increased purity, particularly with respect to those plant substances which are therapeutically irritating and which normally interfere with the beneficial action of the chlorophyll.

Attention is particularly directed to the fact that the chlorophyll, following decanting of the salt solution is adapted to be, where desired, washed on a buchner filter or by means of a separatory funnel, limited amounts of salt solution being utilized for this purpose. Where the presence of even a small amount of adherent salt is objectionable, a limited washing with distilled water is advisable. It is particularly important to point out, however, that in general washing of the separated crystals or particles is not necessary or desirable in view of the losses entailed as compared with the relatively minor increase in purity effected through this procedure. That is to say, the foregoing treatment by the initial and restricted batch of salt solution results in a substantially complete removal of the undesired impurities.

It will further be understood from the foregoing that the utilization of excess quantities of salt solution or other washing liquid is to be avoided in view of the ready solubility of chlorophyllin therein. While it is inevitable that loss does occur by solution, this loss is obviously limited by limiting the amount of solvent as well as by reuse of the solvent and the practice of solvent recovery. Thus, it has been found that fatty and waxy impurities may be separated by further settling and decantation or filtration of the effluent from the evaporating dish and this preparation may be again used to overlie a mass of chlorophyllin particles and to effect a further separation of the undesired impurities. The chlorophyll contained in the solution may be recovered by evaporation and particularly by fractional crystallization or by taking up the solution in a substantial quantity of petroleum ether and acetone followed by washing out the acetone with water until the chlorophyll precipitates in the petroleum ether layer.

It is important to note that the particle size of the crude chlorophyll under treatment appears relatively unimportant. Thus, a substantial purification takes place irrespective of a relatively wide variation in character and size of the substance initially employed. In general, the materials are commercially available in the form of powder or particles the largest of which are not substantially more than ⅛ of an inch across. Whether in this form or ground to finer particulate form, the method is operative even though a fine degree of grinding is practiced. It is conceived therefore that the water soluble chlorophyll during formation actually tends to crystallize or form in such a way that the purities are not entrapped within the crystals or particles during their formation but tend to adhere to adjacent surfaces. In accordance with the present invention, it is thought that the salt lowers the affinity of the impurities for the chlorophyll particles, thus facilitating separation. It is to be noted that the final purified product is preferably dried, in which condition it may contain a proportion of residual salt. This impurity, however, as pointed out above, is not objectionable for therapeutic purposes insofar as it is limited in proportion sufficiently so that resulting therapeutic solutions fall within the isotonic or hypotonic range. Thus, for instance, where the purified product is to be employed in the relationship of one or two grams per liter of water, the residual salt may preferably be adjusted to precisely result in an isotonic solution, or when present in less than the desired quantity, may be later treated by an addition of salt to result in isotonicity. In any event, it will be evident from the foregoing that the procedure may be adjusted both by selection of the concentration of salt solution used in the treatment and by utilizing subsequent washing steps in order to bring the salt content of the purified product into the desired range. So also, where a salt-free product is desired, fractional crystallization may be resorted to, or the chlorophyll may be purified by solvent recovery in accordance with conventional practices. Thus, by such practice, the chlorophyll may be dissolved in aqueous acetone to which is admixed an equal quantity of petroleum ether and the acid removed by washing until the chlorophyll particles have precipitated. The particles are then separated by filtration or in any other conventional manner.

From the foregoing, it will be evident that the present process lends itself to utilization with known chlorophyll extraction and preparation steps. For example, the chlorophyll is preferably treated as above after separation and crystallization although the treatment may be applied to various solutions thereof, whether organic or aqueous, prior to the recovery of the water soluble material. Thus, for example, organic solutions of the chlorophyllin containing for example methyl alcohol and acetone may be treated by the addition of a large proportion of salt to facilitate the separation of the chlorophyllin and impurities, particularly fatty or waxy impurities, which in the presence of the salt collect separately where they can be readily removed by decantation. By way of illustration, this may be accomplished by adding a substantial quantity of salt or salt and water to an acetone, petroleum ether, methyl alcohol or even an aqueous solution of chlorophyll, after which the resulting composition is evaporated under vacuum. The impurities and the chlorophyll separate out and the impurities can be removed by decantation leaving the chlorophyll particles. The concentration by evaporation may be carried as far as desired to bring about crystallization of the chlorophyll. The result of the treatment is that the impurities tend to collect separately from the chlorophyll crystals so that they can be removed together with the mother liquor in any convenient manner.

The same process, although in substantially lesser degree of effectiveness, is applicable to the so-called fat or oil soluble forms of chlorophyll, namely chlorophylls A and B. Thus this product is treated with a concentrated salt solution as above. The product being more oily in nature must be broken up and agitated with the salt solution. In view of the insolubility of the chlorophyll in the aqueous liquid any desired excess of the latter may be employed, and washing may be repeated any number of times to fully remove excess salt. The present material after removal of the salt, now suitably lends itself to solvent repurification as by taking up in petroleum ether acetone solution as above followed by washing out the acetone to recover the chlorophyll.

The present invention provides a simple, inexpensive and effective method for removing the characteristic impurities which interfere with therapeutic activity of the chlorophyll, presumably by virtue of an irritating, protective or diluting action. Thus, while the initial materials, even though considered of relatively high purity insofar as commercial practice is concerned, are normally unsuitable for use in connection with tissue, the purified products are effective and non-irritating.

It is thought that the invention and numerous of its attendant advantages will be understood from the foregoing description and it is obvious that numerous changes may be made in the process without departing from the spirit or scope of the invention or sacrificing any of its attendant advantages, the form herein described being a preferred embodiment for the purpose of illustrating the invention.

I claim:

1. The method of separating chlorophyll and impurities associated with chlorophyll as recovered from natural sources of chlorophyll which comprises forming a system including a salt solution containing a substantial concentration of a freely water soluble salt, chlorophyll and impurities initially associated with said chlorophyll, the quantity of chlorophyll in the system exceeding substantially the amount soluble in the quantity of salt solution present then allowing the system to stand undisturbed for an extended period after the chlorophyll in excess of that soluble in the solution has settled to the lower part of the system and until impurities have risen to the surface of the salt solution and separating the impurities and salt solution from the underlying chlorophyll.

2. The method of separating chlorophyll and impurities associated with chlorophyll as recovered from natural sources of chlorophyll which comprises bringing together a salt solution containing a substantial concentration of a freely water soluble salt and a quantity of an impure chlorophyll composition in solid form including an amount of chlorophyll substantially exceeding the amount soluble in such salt solution, then allowing the system to stand undisturbed for an extended period after the chlorophyll in excess of that soluble in the solution has settled to the lower part of the system and until impurities from such impure chlorophyll composition have risen to the surface of the salt solution and separating the impurities and salt solution from the underlying chlorophyll.

3. The method of separating chlorophyll and impurities associated with chlorophyll as recovered from natural sources of chlorophyll which comprises treating the solvent in a solution of an impure chlorophyll composition to form therefrom a salt solution containing a substantial concentration of a freely water soluble salt which salt solution is substantially less in quantity than is required to dissolve said chlorophyll whereby said chlorophyll is precipitated, then allowing the system to stand undisturbed for an extended period after the chlorophyll in excess of that soluble in the solution has settled to the lower part of the system and until impurities from such impure chlorophyll composition have risen to the surface of the salt solution and separating the impurities and salt solution from the underlying chlorophyll.

4. The method of separating water soluble chlorophyll and impurities associated with water soluble chlorophyll as recovered from natural sources of chlorophyll which comprising forming a system including an aqueous salt solution containing a substantial concentration of a freely water soluble salt, water soluble chlorophyll and impurities initially associated with said chlorophyll, the quantity of chlorophyll in the system exceeding substantially the amount soluble in the quantity of salt solution present then allowing the system to stand undisturbed for an extended period after the chlorophyll in excess of that soluble in the solution has settled to the lower part of the system and until impurities have risen to the surface of the salt solution and separating the impurities and salt solution from the underlying chlorophyll.

5. The method of separating water soluble chlorophyll and impurities associated with water soluble chlorophyll as recovered from natural sources of chlorophyll which comprises bringing together an aqueous salt solution containing a substantial concentration of a freely water soluble salt and a quantity of an impure water soluble chlorophyll composition in solid form including an amount of chlorophyll substantially exceeding the amount soluble in such salt solution, then allowing the system to stand undisturbed for an extended period after the chlorophyll in excess of that soluble in the solution has settled to the lower part of the system and until impurities from such impure chlorophyll composition have risen to the surface of the salt solution and separating the impurities and salt solution from the underlying chlorophyll.

6. The method of separating water soluble chlorophyll and impurities associated with water soluble chlorophyll as recovered from natural sources of chlorophyll which comprises forming a system including a saturated aqueous solution of a freely water soluble salt, water soluble chlorophyll and impurities initially associated with said chlorophyll, the quantity of chlorophyll in the system exceeding substantially the amount soluble in the quantity of salt solution present then allowing the system to stand undisturbed for an extended period after the chlorophyll in excess of that soluble in the solution has settled to the lower part of the system and until impurities have risen to the surface of the salt solution and separating the impurities and salt solution from the underlying chlorophyll.

7. The method of separating water soluble chlorophyll and impurities associated with water soluble chlorophyll as recovered from natural sources of chlorophyll which comprises bringing together an aqueous sodium chloride solution containing a substantial concentration of sodium chloride and a quantity of an impure water soluble chlorophyll composition in solid form including an amount of chlorophyll substantially exceeding the amount soluble in such salt solution, then allowing the system to stand undisturbed for an extended period after the chlorophyll in excess of that soluble in the solution has settled to the lower part of the system and until impurities from such impure chlorophyll composition have risen to the surface of the salt solution and separating the impurities and salt solution from the underlying chlorophyll.

8. The method of separating water insoluble chlorophyll and impurities associated with water insoluble chlorophyll as recovered from natural sources of chlorophyll which comprises bringing together an aqueous salt solution containing a substantial concentration of a freely water soluble salt and an impure water insoluble chlorophyll composition in finely divided solid form, agitating the chlorophyll and salt solution to bring them into intimate contact, and then allowing the system to stand undisturbed for an extended period after the chlorophyll has settled to the lower part of the system and until impurities from such impure chlorophyll composition have risen to the surface of the salt solution and separating the impurities and salt solution from the underlying chlorophyll.

9. The method of separating chlorophyll and impurities associated with chlorophyll as recovered from natural sources of chlorophyll which comprises forming a system including a salt solution containing a substantial concentration of a freely water soluble salt, chlorophyll and impurities initially associated with said chlorophyll, the quantity of chlorophyll in the system exceeding substantially the amount soluble in the quantity of salt solution present then allowing the system to stand undisturbed for about 24 hours and thereafter separating the salt solution and the impurities which have risen to the surface thereof from the underlying chlorophyll.

10. The method of separating water soluble chlorophyll and impurities associated with water soluble chlorophyll as recovered from natural sources of chlorophyll which comprises bringing together an aqueous salt solution containing a substantial concentration of a freely water soluble salt and a quantity of an impure water soluble chlorophyll composition in solid from including an amount of chlorophyll substantially exceeding the amount soluble in such salt solution, then allowing the system to stand undisturbed for about 24 hours and thereafter separating the salt solution and the impurities which have risen to the surface thereof from the underlying chlorophyll.

11. The method of separating water soluble chlorophyll and impurities associated therewith which comprises bringing together a concentrated aqueous sodium chloride solution and a quantity of an impure water soluble chlorophyll composition in solid form including an amount of chlorophyll substantially exceeding the amount soluble in such salt solution, then allowing the system to stand undisturbed for about 24 hours and thereafter separating the salt solution and the impurities which have risen to the surface thereof from the underlying chlorophyll.

BENJAMIN GRUSKIN.

REFERENCES CITED

The following references are of record in the file of this patent:

UNITED STATES PATENTS

| Number | Name | Date |
|---|---|---|
| 2,120,667 | Gruskin | June 14, 1938 |
| 2,296,004 | Platt | Sept. 15, 1942 |

FOREIGN PATENTS

| Number | Country | Date |
|---|---|---|
| 444,276 | Great Britain | Mar. 18, 1936 |

OTHER REFERENCES

Biochemical Laboratory Methods, Morrow 1927. John Wiley & Sons. (Copy in Div. 59, pp. 307–310.)

Systematic Organic Chem., Cumming, Hopper, Wheeler, Constable & Co. 1929. (Copy in Div. 6, p. 34.)

Ind. & Eng. Chem., Nov. 1941, pp. 1428–1432.

Certificate of Correction

Patent No. 2,434,649. January 20, 1948.

BENJAMIN GRUSKIN

It is hereby certified that errors appear in the printed specification of the above numbered patent requiring correction as follows: Column 4, line 49, for the word "resdual" read *residual*; column 8, line 15, claim 10, for "from" read *form*; same column, list of references cited, under "UNITED STATES PATENTS" add—

1,260,984    Maclaurin _____ Mar. 26, 1918 under "FOREIGN PATENTS" add—

232,041    Great Britain _____ Apr. 15, 1925 and under "OTHER REFERENCES", line 55, for "Wheeler, Constable & Co. 1929" read *Wheeler, Constable & Co. 1931*; and that the said Letters Patent should be read with these corrections therein that the same may conform to the record of the case in the Patent Office.

Signed and sealed this 20th day of April, A. D. 1948.

[SEAL]

THOMAS F. MURPHY,
*Assistant Commissioner of Patents.*